United States Patent [19]

Zuercher, deceased

[11] 3,923,984

[45] Dec. 2, 1975

[54] SHELF STABLE MULTI-USE COMPOSITION, PREPARATION AND USE

[75] Inventor: Carl J. Zuercher, deceased, late of Pinellas Park, Fla., by Ernestine Zuercher, executrix

[73] Assignee: Beatrice Z. Atha, Richmond, Va.

[22] Filed: Feb. 11, 1974

[21] Appl. No.: 441,631

[52] U.S. Cl. ............................................... 424/195
[51] Int. Cl.² ......................................... A61K 35/78
[58] Field of Search .................................... 424/195

[56] References Cited
OTHER PUBLICATIONS

Merck Index, 7th Ed., 1960, pp. 200–201, 489–490, 1010–1011, 746, 751.

Martin; Husa's Pharmaceutical Dispensing, (1966), pp. 288–290, 238.

Chem. Abst[(1)] 44 – 7028B, (1950).

Chem. Abst[(2)] 45 – Subject Index – 11995, (1951).

*Primary Examiner*—Stanley J. Friedman
*Attorney, Agent, or Firm*—Burns, Doane, Swecker & Mathis

[57] ABSTRACT

An improved multi-use composition having shelf stability of at least 6 months and suitable for use as a pain reliever, burn healing agent, antiphlogistic and for the treatment of canker sores and the like is disclosed. The multi-use composition may be prepared by the addition of particular, separately prepared, solutions to an aqueous camphor solution.

7 Claims, No Drawings

1

SHELF STABLE MULTI-USE COMPOSITION, PREPARATION AND USE

BACKGROUND OF THE INVENTION

Various preparations are known in the art which have been used for external application to a warm blooded animal to relieve the bodily sensations of pain and discomfort associated therewith. These preparations are primarily concerned with dulling the pain and discomfort and require frequent application while the body processes act to restore the traumatized area to its normal state. While many of these preparations adequately dull pain, problems remain with the formulation and use of the preparations.

One of the common problems with known preparations is their inability to maintain a homogeneous solution for a commercially acceptable time period. As understood in the art, preparations of this type need a stable shelf life of at least about 6, generally about 12 months or more. Many available preparations after sitting for a few days or less tend to form multi-phase solutions, often accompanied by the precipitation of a solid material, which non-homogeneous solutions are difficult or impossible to re-mix into a single phase, homogeneous solution. The shelf-stability problem is compounded in multi-use preparations which are intended for use in the treatment of different types of pain and discomfort. Often, the particular compounds which promote the different types of healing and/or pain relief (e.g., pain-relieving, antiphlogistic, burn healing, etc.) are not mutually soluble in the same solvent and/or otherwise possess physical or chemical characteristics which decrease the shelf stability of the resulting mixture.

In addition, many of the available preparations must be carefully segregated and labelled for use to differentiate the treatment of children and adults. Multiple strength preparations must therefore be formulated.

OBJECTS AND SUMMARY OF THE INVENTION

It is an object of this invention to provide a method for producing a pain relieving composition which has a commercially acceptable shelf life and the resulting composition.

It is another object of this invention to provide a method for preparing a multi-use pain relieving and burn healing composition and the resulting multi-use composition which is shelf stable for 6 months or more.

It is also an object of this invention to provide a method for preparing a pain relieving and burn healing composition and the resulting composition which can be used in the treatment of children and adults alike in a single strength formulation.

It is further an object of this invention to provide a pain relieving and burn healing composition for external treatment of warm blooded animals.

These and other objects of the invention are achieved on one aspect by a process for the preparation of a shelf-stable multi-use pain reliever and burn healing composition which comprises: (a) preparing a solution of camphor and distilled water in a ratio of from about 25 to 30 grams of camphor per 128 ounces of distilled water; (b) preparing a solution of a healing agent and an antiseptic in a co-solvent mixture containing a surfactant, said healing agent and antiseptic being present in an amount by volume of about 40 cc per 245 cc of the said healing agent-containing solution; (c) preparing a solution of a sweetner in a co-solvent mixture, said sweetner being present in an amount of from about 50 grams per 450 cc of the said three co-solvent mixture; (d) preparing a solution of a pain reliever and a surfactant in a solvent, said pain reliever being present in an amount by volume of about 10 cc per 130 cc of the said pain reliever-containing solution; (e) preparing a solution of a flavoring agent in a co-solvent mixture, the flavoring agent being present in an amount of about 1 gram per 100 cc of the said flavoring agent-containing solution; (f) mixing from about 5 to about 10 ounces of a humectant and from about 3 to about 10 grams of an astringent to the said camphor solution; and (g) mixing in thereafter from about 1 to about 4 ounces of the said healing agent and antiseptic solution, from about ½ to about 2 ounces of the sweetner solution, from about 1 to about 4 ounces of the flavoring agent-containing solution, from about 1 to about 4 ounces of a humectant, from about 178 to about 3 ounces of the pain reliever solution.

In another aspect, these and other objects of the invention are achieved by the product of the above process.

In still another aspect, these and other objects of the present invention are achieved by a method for treating pain which comprises externally applying to a patient in pain the above product.

DESCRIPTION OF THE PREFERRED EMBODIMENTS

The ingredients which are used in formulating the novel preparation of the present invention are well-known in the art for their various therapeutic-flavoring, humectant, moistening agent, solvent or other properties for which they are used in the present invention. They have not, however, heretofore been combined in the hereinafter disclosed manner.

In accordance with the present invention, a series of solutions of various components of the pain relieving and burn healing composition of the present invention are prepared separately and combined in a particular manner to form a shelf stable multi-use composition.

In a general procedure for the preparation of the novel antiphlogistic and pain relieving composition of the present invention, camphor, either synthetic of U.S.P. Grade in an amount of generally from about 20 to 30, preferably 25 to 30, grams in the form of fine flakes, is mixed with agitation in about 128 fluid ounces of distilled water for 20 minutes using a Lightning mixer. Dissolution of the camphor in the water can be facilitated by letting the solution age for a suitable period of about 72 hours with intermittant agitation of fifteen minutes per day.

A solution is also prepared of a healing agent and an antiseptic in a co-solvent mixture. This solution preferably also contains one or more surfactants to facilitate mixing of the healing agent and antiseptic in the cosolvent mixture. The healing agent-containing solution can be prepared by mixing together about 50 cc of a surfactant such as Tween 80 (a commercially available surfactant which is polyoxyethylene sorbitan monooleate) and 60 cc of Tween 20 (a commercially available surfactant which is polyoxyethylene sorbitan monolaurate) with 25 cc of a healing agent such as oil of sage, Dalmation (Selected White Grade) and 15 cc of an antiseptic such as oil of Thyme or oil of Salvia. These materials can be mixed together for a short time of, for example, about 10 minutes and then added slowly to a co-solvent mixture of 20 cc of distilled water and 75 cc of a suitable glycol such as propylene glycol. The total healing agent and antiseptic solution mixture which contains about 40 cc of the healing agent and antiseptic per 245 cc of the said solution is then mixed for a time sufficient to thoroughly mix the materials and form a homogeneous solution, which time can be, for example, about 20 minutes.

A sweetner solution can be made by mixing together a co-solvent mixture of 200 cc of water and 250 cc of a suitable glycol such as propylene glycol and heating the co-solvent mixture to about 130°F. A sweetening agent such as ammoniated glycyrrhizin granules (50 grams) may be mixed and added thereto and the mixture of the 50 grams of sweetner per 450 cc of the co-solvent mixture maintained at 130°F. until all of the ammoniated glycyrrhizin granules are dissolved. The mixture is thereaftere preferably mixed and aged.

A pain reliever-containing solution may be formed utilizing 10 cc of a pain reliever such as eugenol (4-allyl-2-methoxyphenol) U.S.P. Grade or oil of cloves (which contains about 82 to 87 percent eugenol) which is mixed first with 30 cc of Tween 80 and then blended with 90 cc of a suitable glycol solvent such as propylene glycol to form a solution of 10 cc of pain reliever per 130 cc of the said solution.

A flavoring agent solution may be formed by first mixing together 25 cc of a suitable glycol such as propylene glycol (U.S.P.) and 25cc of glycerin (U.S.P.) or glycerol as an additional solvent. An equal volume amount (i.e., 50 cc) of distilled water may be added to the glycol-glycerin mixture and 1gram of a suitable flavoring agent such as maltol (3-hydroxy-2-methyl-4-pyrone), commercially available under the trade name Veltol or other suitable flavoring agent. The total mixture of 1 gram of flavoring agent per 100 cc of the said solution is then mixed and blended.

The novel pain relieving and burn healing composition of the present invention may be formed by first adding a suitable amount of glycerin and tannic acid (the glycerin being a solvent and the tannic acid being an astringent) to the camphor solution. For example, from about 5 to about 10 ounces of glycerin and from about 3 to about 10 grams of tannic acid may be added to from about 96 to about 128 ounces of the camphor solution. The various components may thereafter be added in appropriate amounts. For example, from about 1 to about 4 ounces of the healing agent and antiseptic-containing solution may be mixed along with from about ½ to about 2 fluid ounces of the sweetner solution, from about 1 to about 4 ounces of the flavoring agent solution, and from about ½ to about 3 ounces of the pain reliever-containing solution. In addition, from about 1 to about 4 ounces of sorbitol, a humectant, may be added to the composition. Preferably, these materials are all mixed together for a relatively short time, suitable to form a homogenous solution which time can be, for example about 20 minutes, blended, bottled and capped.

It will be understood that all materials used should be of U.S.P. Grade. In addition, and unless indicated otherwise, all parts, ratios and percentages are by weight.

The novel preparation of the present invention is useful as an antiphlogistic and as a pain reliever. In addition, the preparation can be used externally and in the oral cavity for the amelioration of the discomfort associated with pain and inflammation, burns, blisters, canker sores and the like.

Successful healing of burns, relieving of pain and soothing of canker sores has been achieved utilizing the following specific composition:

100 ounces aqueous camphor solution
7 ounces glycerin, U.S.P.
5 grams Tannic Acid N. F. Fluffy
2 ounces healing agent and antiseptic solution
1 ounce sweetner solution
3 ounces flavoring agent solution
2 ounces pain reliever solution
2 ounces sorbitol The camphor solution is made by thoroughly blending 28 grams of synthetic camphor with 128 ounces of distilled water. The solution is mixed for 20 minutes in a Lightning mixer and aged for 72 hours with 15 minutes agitation every 24 hours.

The healing agent and antiseptic solution is formed by mixing 50 cc of Tween 80 (U.S.P.) and 60 cc of Tween 20 (U.S.P.) to which is added 25 cc oil of sage, Dalmation Selected White, and 15 cc oil of Thyme (containing 40 to 45 percent phenols). The mixture is mixed moderately for 10 minutes and then added slowly to a co-solvent mixture of 20 cc of distilled water and 75 cc propylene glycol (U.S.P.). The total mixture is blended to form a homogeneous solution.

The sweetner solution is made by adding 50 grams of ammoniated glycyrrhizin granules into a co-solvent mixture of 200 cc distilled water and 250 cc propylene glycol (U.S.P.) maintained at 130°C. until the ammoniated glycyrrhizin granules are dissolved and the solution is thoroughly mixed.

The pain reliever solution is made by mixing together 10 cc eugenol (U.S.P.) and 30 cc of Tween 80 (U.S.P.) which is thereafter thoroughly blended and mixed with 90 cc propylene glycol (U.S.P.)

The flavoring agent solution is made by first mixing together 25 cc propylene glycol (U.S.P.) and 25 cc of glycerin (U.S.P.). 50 cc of distilled water is added and the total co-solvent mixture blended. 1 gram of maltol is mixed therein and the total mixture is thoroughly blended.

The pain relieving and burn healing composition is formed by first adding the glycerin and tannic acid with stirring to the camphor solution until the mixture is uniform. The healing agent and antiseptic solution, sweetner solution, flavoring agent solution, pain reliever solution and sorbitol are blended into the camphor solution in any order with stirring. The total composition is blended for 20 minutes, aged for 96 hours with 15 minutes mixing every 24 hours, filtered bright, bottled and capped. The homogeneous solution is shelf stable for more than 12 months.

This composition is externally applied to a patient having a painful burn on his hand. The composition promotes healing of the burned area and in relieving the patient's pain.

Another patient is treated with this composition for canker sores by applying the composition impregnated on a cotton swab onto the external appurtenances of the canker sores. The pain from these sores is reduced and healing is promoted.

An equivalent mixture is formed of each of the individual compounds used in the preparation of the specific illustration of the pain relieving and burn healing composition of the present invention and in the same relative amounts without, however, forming the specific solutions as described above which are thereafter blended in the total mixture. Instead, each of these components is placed in a large mixing vessel and the total mixture is agitated for 20 minutes. After agitating is stopped, the mixture separates into a multiphase mixture. The mixture is then agitated for 20 minutes again. After agitation is completed, the mixture again separates into a multi-phase, multi-layered mixture. A shelf stable, homogeneous mixture cannot be formed in this manner even after repeated mixings.

It will be understood that specific example described above is intended to be illustrative of a specific embodiment of the present invention and the invention is not intended to be limited thereto.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for the preparation of a shelf-stable multi-use pain relieving and burn healing composition which comprises:
   a. preparing a solution of camphor and distilled water in a ratio of from about 20 to 30 grams of camphor per 128 ounces of distilled water;
   b. preparing a healing agent solution of oil of sage, Dalmation and oil of thyme in a co-solvent mixture of water and a glycol containing a surfactant, said oil of sage, Dalmation and oil of thyme being present in an amount by volume of about 40 cc per 245 cc of the said healing agent-containing solution;
   c. preparing a sweetener solution of ammoniated glycyrrhizin in a co-solvent mixture of water and a glycol, said sweetener being present in an amount of about 50 grams per 450 cc of the said co-solvent mixture;
   d. preparing a pain-reliever solution of eugenol and a surfactant in a glycol solvent, said eugenol being present in an amount by volume of about 10 cc per 130 cc of the said pain reliever-containing solution;
   e. preparing a flavoring agent solution of maltol in a co-solvent mixture of water and a glycol, the maltol being present in an amount of about 1 gram per 100 cc of the said flavoring agent-containing solution;
   f. mixing from about 5 to about 10 ounces of sorbitol and from about 3 to about 10 grams of tannic acid to the said camphor solution; and
   g. mixing in thereafter from about 1 to about 4 ounces of the said healing agent and said antiseptic solution, from about ½ to about 2 ounces of the sweetener solution, from about 1 to about 4 ounces of the flavoring agent-containing solution, from about 1 to about 4 ounces of a humectant, from about ½ to about 3 ounces of the pain reliever solution.

2. The process of claim 1 wherein said pain relieving and burn healing composition is formed by mixing together:

100 cc of the camphor solution
   7 ounces of glycerin
   5 grams of tannic acid
   2 ounces of the healing agent and antiseptic solution
   1 ounce of the sweetner solution
   3 ounces of the flavoring agent solution
   2 ounces of the pain reliever solution and
   2 ounces of a humectant 3. The process of claim 2 wherein said humectant is sorbitol.

4. The product of the process of claim 1.

5. The product of the process of claim 3.

6. A method for treating pain which comprises externally applying to a patient in pain the product of claim 4.

7. A method for treating pain which comprises externally applying to a patient in pain the product of claim 5.

* * * * *